(12) United States Patent
Miyano

(10) Patent No.: US 6,789,196 B1
(45) Date of Patent: Sep. 7, 2004

(54) COMMUNICATION CONTROLLING METHOD, COMMUNICATION CONTROLLING SYSTEM AND COMMUNICATION CONTROLLING APPARATUS

(75) Inventor: Michio Miyano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/324,450

(22) Filed: Jun. 2, 1999

(30) Foreign Application Priority Data

Jun. 3, 1998 (JP) .......................................... 10-154821

(51) Int. Cl.[7] ............................ H04L 9/00; H04L 12/22
(52) U.S. Cl. ........................ 713/189; 713/201; 713/153
(58) Field of Search ........................ 713/189; 380/212, 380/239

(56) References Cited

U.S. PATENT DOCUMENTS

| | | | | |
|---|---|---|---|---|
| 4,694,491 A | * | 9/1987 | Horne et al. ................. | 380/239 |
| 4,887,296 A | * | 12/1989 | Horne ......................... | 380/239 |
| 5,170,252 A | | 12/1992 | Gear et al. | |
| 5,625,693 A | * | 4/1997 | Rohatgi et al. ............. | 713/187 |
| 5,631,693 A | * | 5/1997 | Wunderlich et al. .......... | 725/91 |
| 5,774,548 A | * | 6/1998 | Bando et al. ................ | 380/212 |
| 5,867,484 A | | 2/1999 | Shaunfield | |
| 5,899,578 A | * | 5/1999 | Yanagihara et al. .......... | 386/75 |
| 5,937,063 A | * | 8/1999 | Davis ......................... | 713/187 |
| 5,959,692 A | * | 9/1999 | Nakaya et al. .............. | 348/607 |
| 5,973,625 A | * | 10/1999 | Nam ........................... | 341/50 |
| 5,999,569 A | * | 12/1999 | Oshima ....................... | 375/265 |
| 6,021,197 A | * | 2/2000 | von Willich et al. ........ | 380/212 |
| 6,023,295 A | * | 2/2000 | Pau ........................... | 375/240.04 |
| 6,034,732 A | * | 3/2000 | Hirota et al. ................ | 348/441 |
| 6,128,352 A | * | 10/2000 | Maeda ........................ | 375/316 |
| 6,167,099 A | * | 12/2000 | Rader et al. ................ | 375/347 |
| 6,282,294 B1 | * | 8/2001 | Deo et al. ................... | 380/270 |
| 6,385,319 B1 | * | 5/2002 | Nyu ........................... | 380/274 |
| 6,438,693 B1 | * | 8/2002 | Nakano ....................... | 713/189 |
| 6,560,340 B1 | * | 5/2003 | Akins, III et al. .......... | 380/239 |

* cited by examiner

Primary Examiner—Gilberto Barrón
Assistant Examiner—Kambiz Zand
(74) Attorney, Agent, or Firm—Frommer Lawrence & Haug LLP; William S. Frommer; Dennis M. Smid

(57) ABSTRACT

A communication controlling system which permits plural broadcast programs from plural broadcast program providers to be viewed easily and inexpensively. For a case wherein plural broadcast signals containing a hierarchy in need of differential scrambling and a hierarchy that permits common demodulation, encoding or demultiplexing are transmitted/received on a bus 1, the system includes signal processing devices 3 to 5 for performing descrambling and a reception device 2 for performing common processing, such as demodulation, encoding and demultiplexing. The bus 1 is the IEEE1394 bus, so that, if any one of plural broadcast programs is designated, the signal processing device corresponding to the designated broadcast signals can be automatically set by the control node on the bus 1, at the same time as a path used for transmitting/receiving signals between the reception device 2 and the signal processing device as set can be set or cancelled.

29 Claims, 13 Drawing Sheets

| OFFSET | NAME | OPERATION |
|---|---|---|
| 000h | STATE_CLEAR | STATUS AND CONTROL INFORMATION |
| 004h | STATE_SET | SETS STATE_CLEAR BIT |
| 008h | NODE_IDs | INDICATES 16-BIT NODE ID |
| 00Ch | RESET_START | START COMMAND RESET |
| 018h-01Ch | SPLIT_TIMEOUT | SETS MAXIMUM TIME OF SPLIT |
| 200h | CYCLE_TIME | CYCLE TIME |
| 210h | BUSY_TIMEOUT | SETS RETRY LIMITATION |
| 21Ch | BUS_MANAGER | INDICATES PATH MANAGER ID |
| 220h | BANDWIDTH_AVAILABLE | INDICATES RANGE ALLOCATABLE TO ISOCHRONOUS COMMUNICATION |
| 224h-228h | CHANNELS_AVAILABLE | INDICATES USE STATE OF EACH CHANNEL |

FIG.6

| Addr | Register |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG.9

FIG.10A oMPR

| data rate capability | broadcast channel base | non-persistent extension field | persistent extension field | reserved | number of output plugs |
|---|---|---|---|---|---|
| 2 | 6 | 8 | 8 | 3 | 5 | (bit) |

FIG.10B oPCR [n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 | (bit) |

FIG.10C iMPR

| data rate capability | reserved | non-persistent extension field | persistent extension field | reserved | number of input plugs |
|---|---|---|---|---|---|
| 2 | 6 | 8 | 8 | 3 | 5 | (bit) |

FIG.10D iPCR [n]

| on-line | broadcast connection counter | point-to-point connection counter | reserved | channel number | reserved |
|---|---|---|---|---|---|
| 1 | 6 | 6 | 2 | 6 | 16 | (bit) |

COMMUNICATION CONTROLLING METHOD, COMMUNICATION CONTROLLING SYSTEM AND COMMUNICATION CONTROLLING APPARATUS

BACKGROUND OF THE INVENTION

1. Field of the Invention

This invention relates to a communication controlling method and apparatus for transmitting/receiving the information of a broadcast program etc furnished by a broadcast program purveyor on a communication channel.

2. Description of the Related Art

The signals of broadcast programs (referred to below as broadcast signals) furnished by a broadcast program purveyor (referred to below as broadcast provider) to specified users, such as subscribers, are usually processed in a specified manner, such as encryption, more specifically scrambling, adopted by the broadcast provider. Therefore, in order to view the broadcast programs, the broadcast signals furnished by the broadcast provider need to be processed in a manner corresponding to the pre-set signal processing adopted by the broadcast provider. That is, in order to view the broadcast programs furnished by the broadcast provider, a dedicated device is required which not only receives the broadcast signals but also performs signal processing corresponding to the pre-set signal processing. Among the broadcast programs furnished to the specified users after being processed in a specified manner, that is by scrambling etc, there are, for example, chargeable broadcast programs.

There are usually plural broadcast providers, such that it is a frequent occurrence that the specified signal processing adopted by these plural broadcast providers are also different. Thus, if plural broadcast programs are furnished by the plural broadcast providers, and these broadcast programs furnished by the different broadcast providers are to be viewed, not only the different broadcast signals need to be received, but also the broadcast signals need to be processed in accordance with the different signal processing adopted by the different broadcast providers. Therefore, plural dedicated devices are required.

Therefore, the user desiring to view plural broadcast programs finished by the different broadcast providers is compelled to purchase these plural dedicated devices at considerable economic demerits.

SUMMARY OF THE INVENTION

It is therefore an object of the present invention to provide a communication method and apparatus which enables plural broadcast programs from plural broadcast providers to be viewed easily and inexpensively.

The communication controlling method according to claim 1, in which a plurality of signals containing a hierarchy in need of different processing and a hierarchy that permits common processing are transmitted or received over a communication route, includes a designating step for designating which of the plural signals is to be processed to output the result of designation, a differential processing step for performing differential processing for respective signals of the hierarchy in need of different processing, based on the result of designation, an identical processing step for performing common processing for the hierarchy in the plural signals that permits common processing, and a route setting or cancelling step for setting or cancelling a communication route for transmitting/receiving signals between the identical processing step and the differential processing step as set.

In the communication controlling method according to claim 2, the communication route includes a first route from the identical processing step to the differential processing step and a second route from the differential processing step to the identical processing step.

The communication controlling system according to claim 9, in which a plurality of signals containing a hierarchy in need of different processing and a hierarchy that permits common processing are transmitted or received over a communication route, includes designating means for designating which of the plural signals is to be processed to output the result of designation, differential processing means for performing differential processing for respective signals of the hierarchy in need of different processing, based on the result of designation, identical processing means for performing common processing for the hierarchy in the plural signals that permits common processing and route setting or cancelling means for setting or cancelling a communication route for transmitting/receiving signals between the identical processing means and the differential processing means as set.

In the communication controlling system according to claim 10, the communication route includes a first route from the identical processing means to the differential processing means and a second route from the differential processing means to the identical processing means.

The communication controlling apparatus according to claim 17, in which a plurality of signals containing a hierarchy in need of different processing and a hierarchy that permits common processing are transmitted or received over a communication route, includes designating means for designating which of the plural signals is to be processed to output the result of designation, selecting means for selecting differential processing means adapted for performing processing on the hierarchy contained in the designated signals in need of different processing, based on the result of designation, in a manner in meeting with the designated signals, identical processing means for performing common processing for the hierarchy in the plural signals that permits common processing, and route setting or cancelling means for setting or cancelling a communication route for transmitting/receiving signals between the identical processing means and the differential processing means as set.

In the communication controlling apparatus according to claim 18, the communication route includes a first route for transmitting signals processed by the identical processing means from the identical processing means to the differential processing means and a second route for transmitting signals processed by the differential processing means from the differential processing means to the identical processing means.

The communication control apparatus according to claim 25, in which a plurality of signals containing a hierarchy in need of different processing and a hierarchy that permits common processing are transmitted or received over a communication route, includes route means for setting or cancelling a communication route adapted for inputting at least one of the plural signals, differential processing means for processing the hierarchy in need of different processing contained in the input signals in a manner in meeting with the input signals, and sending means for sending the signals processed by the differential processing means via the communication route to identical processing means adapted for processing the hierarchy that permits common processing.

In the system of the present invention, an apparatus for receiving broadcast programs is divided into a device not dependent on the broadcast provider and a device dependent on the broadcast provider, such as a reception device and a signal processing device, these two types of the devices being interconnected over an IEEE1394 bus. Thus, if only a user selects a program, the signal processing device to be connected to the reception device can be connected thereto easily and automatically.

If, in the system of the present invention, real-time data, such as digital broadcast program, is to be received, it can be processed in real-time by exploiting the so-called full-duplex system in which two paths are simultaneously set between the reception device and the signal processing device, with the forward path being used for data transmission from the reception device to the signal processing device and with the return path being used for data return from the signal processing device to the reception device.

In the communication control method and apparatus according to the present invention, if plural signals containing a hierarchy in need of differential processing and a hierarchy that permits common processing are transmitted/received on a communication route, and one of such plural signals is designated, control is performed for setting processing for different hierarchies contained in the designated signals and for setting or cancelling the communication route adapted for transmitting/receiving signals between the common processing and the so-set differential processing, whereby the processing on the plural signals can be realized easily and inexpensively. Therefore, if the present invention is applied to a system configured for viewing broadcast programs, the plural broadcast programs from plural broadcast providers can be viewed easily and inexpensively.

BRIEF DESCRIPTION OF THE DRAWINGS

FIG. 6 illustrates the main position, name and the operation of the CSR.

FIG. 9 illustrates the PCR structure.

FIGS. 10A to D illustrate the structure of oMPR, oPCR, iMPR and iPCR.

DESCRIPTION OF THE PREFERRED EMBODIMENTS

Figure 1:
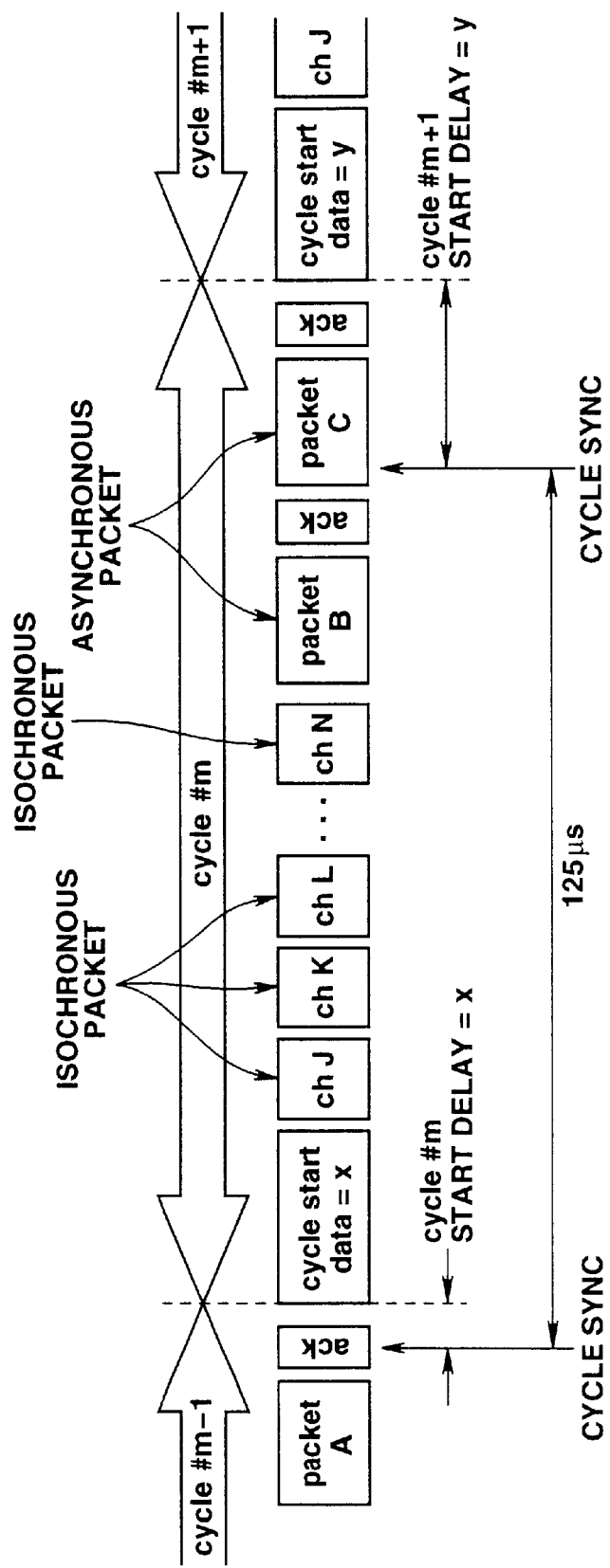
FIG. 1 shows a cyclic structure of data transmission of an equipment connected with IEEE1394.

Referring to the drawings, preferred embodiments of the present invention will be explained in detail.

In the preferred embodiments of the present invention, devices not dependent on the broadcast providers, that is devices irrelevant to pre-set signal processing configurations adopted by the broadcast providers, and devices dependent on the broadcast providers, that is devices relevant to pre-set signal processing configurations adopted by the broadcast providers, are provided as separate structures, the devices not dependent on the broadcast providers are collected as a sole structure not dependent on the broadcast providers and the sole structure not dependent on the broadcast providers is interconnected to the plural devices dependent on the broadcast providers.

By this configuration, there is no necessity of providing plural dedicated devices for viewing plural broadcast programs from the different broadcast providers, thus relieving excess loads otherwise imposed on the user and the developer.

The devices not dependent on the broadcast providers may be enumerated by a reception device, such as a tuner, adapted for receiving signals of the broadcast programs on air, that is broadcast signals. On the other hand, the devices dependent on the broadcast providers may be enumerated by a signal processing device executing the processing corresponding to the pre-set signal processing adopted by the respective broadcast providers, such as a decryption device (descrambler) for deciphering the encryption. The system embodying the present invention is configured so that the above-mentioned sole reception device is interconnected to the plural signal processing devices.

However, if, in the above-described system configuration in which the sole reception device is interconnected to the plural signal processing devices, it is desired to change over the broadcast programs to be viewed, with the broadcast providers furnishing the broadcast programs being also changed over, it becomes necessary to change over the signal processing device connected to the reception device. If, for example, the reception device and the signal processing devices are interconnected in a one-to-one correspondence, the connection needs to be changed each time the broadcast program is changed. On the other hand, if the reception device and the plural signal processing devices are interconnected via switchable distributer, it is similarly necessary to change over the distributor.

In this consideration, in the system embodying the present invention, the reception device and the respective signal processing devices are interconnected over a serial bus of the IEEE1394 standard, one of the equipments connected to a serial bus of the IEEE1394 standard, such as the above-mentioned reception device, is set as a control node in the IEEE1394 standard, with the other equipments, such as the above-mentioned signal processing devices, are set as controlled nodes, with the control node controlling the connection and communication state of the control node itself and the other controlled nodes, in order to eliminate the necessity of re-connecting the reception device to the respective signal processing devices or changing over the distributer even on program changing with concurrent changing of the broadcast provider, and in order to detect the program change automatically to change over the state of interconnection between the reception device and the signal processing devices on issuance of a command for program changing with concurrent changing of the broadcast provider. The control node may also be a signal processing device, or another node (equipment) connected to the serial bus of the IEEE1394 standard, such as a video tape recorder or a television receiver, instead of being the reception device.

The IEEE1394 standard is now explained only briefly.

The IEEE1394 standard is the standard by the IEEE (Institute of Electrical and Electronics Engineers) and is attracting the attention as being a standard suited to multimedia application such as interconnection between household electronics equipments, e.g., digital video recorders, and interconnection between the electronics equipments and a computer.

According to the IEEE1394 standard, transmission is carried out basically using two sets of twisted paired lines. The transmission line is the so-called half-duplex communication employing both sets for transmission in a sole direction. A communication method termed the DS coding is used, in which data is sent over one of the twisted pair lines and a signal termed a strobe is sent over the other line, with the two signals being ANDed to reproduce clocks on the reception side.

The IEEE1394 standard defines three different data rates, namely 98.304 Mbps (S100), 196.608 Mbps (S200) and 393.216 Mbps (S400) and provides so-called upper compatibility according to which an equipment adapted to cope with the higher rate has to support the node (equipment) of a lower data rate.

Each node is permitted to have up to a maximum of 27 ports, such that, by connecting the ports of the respective nodes over the IEEE1394 serial bus, up to a maximum of 63 nodes can be interconnected in a network structure. Meanwhile, such a network configuration is proposed in which a set of nodes (portals) respectively connected to two different IEEE1394 serial buses are used a bridge interconnecting these two different IEEE1394 serial buses, with data being transmitted between two or more buses with the use of this bridge. That is, although the number of the equipments (nodes) connected to the sole IEEE1394 bus is limited to a maximum of 63, it is possible to interconnect a larger number of the nodes if plural buses are interconnected over a bridge to constitute a network structure made up of the bridge and the buses. It has already been proposed to effect data transmission between the nodes (portals) making up the bridge not only over a cable but also by using electrical waves or infrared rays.

In the IEEE1394 standard, the buses are initialized at the time of interconnection and, on interconnecting plural nodes, a tree structure is internally built up automatically. Insofar as the IEEE1394 standard is concerned, signal of the same contents can be transmitted to the totality of the nodes in the network by a given node transmitting signals which are relayed by another node. Thus, for preventing disordered transmitting/reception, it is necessary for respective nodes to arbitrate the right of use of the bus before starting transmission. For acquiring the right to use the bus, a given node waits for the opening of the bus. The node then sends a bus use right request signal to a master node on the tree. On reception of the request, the master node relays the signal to a higher order master node so that the request signal ultimately reaches the control node as the uppermost master node. On reception of the request signal, the control node returns the use permission signal so that the node (controlled node) which has acquired the permission is now able to have communication. If request signals are issued from plural nodes simultaneously, a Thus, on the IEEE1394 standard, plural nodes use the sole bus time-divisionally while competing with one another for the use right.

The IEEE1394 standard defines synchronous communication guaranteeing realtime data transfer, that is isochronous data transfer. The IEEE1394 standard also defines asynchronous data transfer, that is asynchronous with respect to this isochronous data transfer.

In data that needs to be in real-time, such as video or audio data making up the broadcast signals, there is a possibility of producing data dropout unless communication at a constant time interval is guaranteed. Thus, for data that need to be transferred in real-time, basically the isochronous data transfer is used.

In order for a pre-set node to perform this isochronous data transfer, the node needs to be able to cope with the isochronous function.

On the other hand, at least one of the nodes corresponding to this isochronous function needs to possess the function of a cycle master. Moreover, at least one of the nodes connected to the IEEE1394 serial bus needs to possess the function of an isochronous resource manager.

Thus, at the time of previous bus initialization, the isochronous resource manager (ISOCHRONOUS RESOURCE MANAGER) node and the cycle master node are selected from among the nodes connected to the IEEE1394 serial bus.

FIG. 1 shows the cyclic structure of data transfer of the equipments interconnected by IEEE1394. In the IEEE1394 standard, data is split into packets and time-divisionally transferred with a 125 $\mu$s-long cycle as a reference. This cycle is created by a cycle start signal furnished from the cycle master node. An isochronous packet, used for having isochronous communication, acquires the range required for transmission from the leading ends of all cycles and the channel number from the isochronous resource manager. It is noted that the range is so named although it is in time unit. Thus, in the isochronous communication, data transmission within a pre-set time interval is secured. If a transmission error is generated, data is lost because there is no system for protection. The node which has acquired the bus as a result of arbitration sends out asynchronous packets for asynchronous communication during the time not used for isochronous communication of the respective cycles. In the asynchronous communication, reliable transfer is guaranteed by employing acknowledge and retry. However, transfer timing is not constant.

In the system embodying the present invention, the reception device and plural signal processing devices are connected to a IEEE1394 serial bus so that connection and disconnection between respective devices is carried out logically within the bus thus eliminating the operation of switching by insertion or disconnection of physical cables or by a distributor.

The above-mentioned signals, comprised of video or audio data, such as the above-mentioned broadcast programs, need to be in real-time, as mentioned previously, such that, if only one bus, for example, is provided between the reception device and the respective signal processing devices, transmitting/reception of real-time data is carried out in a reciprocating fashion on this sole bus. That is, data transmission from the reception device to the signal processing device and data return from the signal processing device to the reception device are effected on the same bus by way of the so-called half-duplex communication. Although the half-duplex communication is possible as the communication between the reception device and the signal processing device, the preferred embodiment adopts the so-called full-duplex communication for further improving the performance in real-time communication. That is, two paths are simultaneously set between the reception device and the signal processing device, and the data transmission from the reception device to the signal processing device is performed on a forward route, while data return from the signal processing device to the reception device is performed on the return route.

Figure 2:
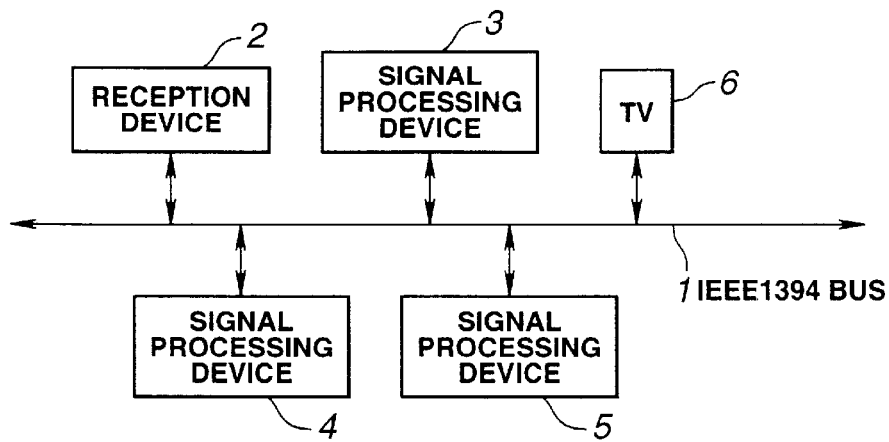
FIG. 2 is a block diagram showing an illustrative system configuration embodying the present invention

FIG. 2 shows, as the configuration of an embodiment of the communication controlling method and apparatus according to the present invention, an illustrative system configuration in which a reception device 2 and plural signal processing devices, herein three signal processing devices 3 to 5, are interconnected using the above-mentioned IEEE1394 serial bus 1 to perform fill-duplex communication between the reception device 2 and the signal processing devices 3 to 5. In the embodiment of FIG. 2, a television receiver 6 for viewing broadcast programs is also connected to the IEEE1394 serial bus 1. Of course, desired other equipments, such as a digital video tape recorder, may also be connected to the IEEE1394 serial bus 1.

It is assumed that, in the preferred embodiment, broadcast signals are transmitted as so-called digital broadcast electrical waves by the broadcast provider and that these broadcast signals are obtained on encoding video, audio and other data, such as letter information or sub-voice grade data, making up the broadcast signals, multiplexing these video, audio and other data, scrambling the resulting multiplexed data and on modulating the carrier wave with the resulting scrambled data. An illustrative encoding is the compression encoding by the so-called MPEG system.

In the system of the preferred embodiment, shown in FIG. 2, the signal processing devices 3 to 5 are descramblers for descrambling the scambled multiplexed data, and are adapted for transmitting/receiving data over the IEEE1394 bus 1.

The reception device 2 receives and demodulates transmission signals by the digital broadcast, demultiplexes the multiplexed data, descrambled by one of the signal processing devices 3 to 5, and decodes the encoded data to restore the video, audio and other data, such as letter information. The reception device 2 is able to transmit/receive data over the IEEE1394 bus 1.

The television receiver 6 is a usual television receiver having a picture display unit, such as a cathode ray tube (CRT) or a liquid crystal display, and a speech outputting unit, such as a speaker, and which is able to transmit/receive data over the IEEE1394 bus 1. Although FIG. 2 shows a configuration of supplying the video, audio and other data directly form the reception device 2 without the intermediary of the IEEE1394 serial bus 1, the television receiver 6 may also be configured for supplying analog video and audio signals instead of digital video and audio data.

Specifically, the system of the preferred embodiment, shown in FIG. 2, receives and demodulates transmitted digital broadcast signals by the reception device 2 and sends the demodulated scrambled signals over the IEEE1394 bus 1 to one of the signal processing devices 3 to 5, in which the scrambled data is descrambled. The signal processing in the signal processing devices 3 to 5 can be respective different scrambling operations or can be effected using different keys. The signal processing device performing the same descrambling operation may be provided on the bus.

The multiplexed data, obtained by the descrambling operation, is returned to the reception device 2 over the same IEEE1394 bus 1. The reception device 2 also demultiplexes the multiplexed data to retrieve and decode encoded video, audio and other data to restore the video, audio and other data. The restored video, audio and other data are routed to the television receiver 6 over the IEEE1394 bus 1. This enables plural broadcast programs purveyed by plural broadcast providers to be viewed.

Figure 3:
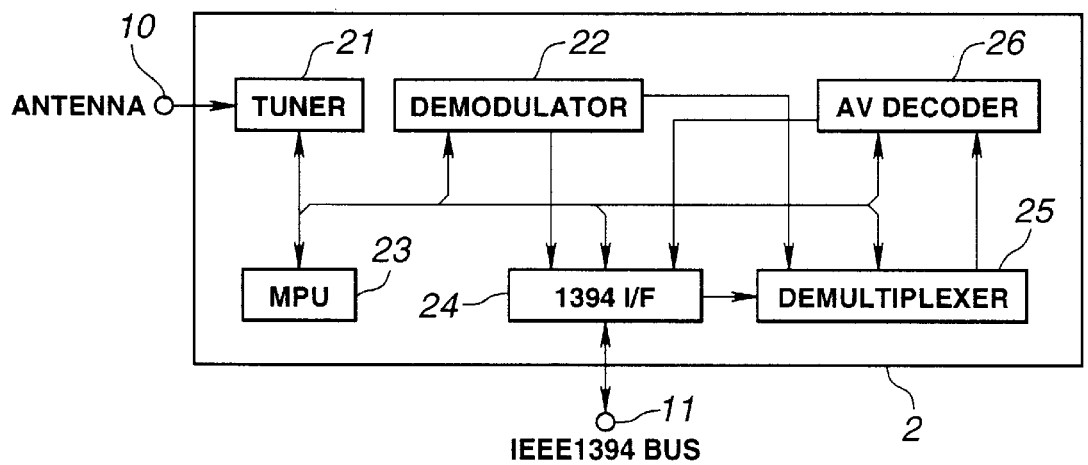
FIG. 3 is a block. diagram showing a specified illustrative structure of a reception device.

FIG. 3 shows a specified illustrative structure of the reception device 2 and FIG. 3 shows a specified illustrative structure of the signal processing devices 3 to 5.

In the reception device 2 of FIG. 3, reception signals from an antenna, not shown, adapted for receiving signals transmitted as the digital broadcast electrical waves, are supplied to a terminal 10 and thence to a tuner 21.

The tuner 21 selects the station of the reception signals to route the resulting selected reception signals to a demodulator 22.

The demodulator 22 demodulates the reception signals to route the resulting demodulated signals to an IEEE1394 interfacing (I/F) unit 24. The data obtained on demodulation by this demodulator 22 is the above-mentioned scrambled data. If the broadcast signals are not scrambled, such as non-chargeable broadcast programs, output data of the demodulator 22 represent multiplexed data which are directly routed to a multiplexer 25 without intermediary of the IEEE1394 interfacing (I/F) unit 24.

For discriminating whether or not the received reception signals are nonchargeable broadcast programs, an ID specifying that effect may be contained in data of the reception signals for discrimination based on the detected ID.

A provider ID may be contained in the reception signal and divided into plural fields in which the information on chargeable/non-chargeable is inserted and occasionally detected to discriminate whether or not the signal is a non-chargeable program.

The IEEE1394 interfacing (I/F) unit 24 constructs a packet prescribed in the IEEE1394 standard, from the scrambled data furnished from the demodulator 22, to transmit the packet data via terminal 11 to the IEEE1394 bus 1. The packet data, thus transmitted to the IEEE1394 bus 1, is routed to one of the signal processing devices 3 to 5.

Figure 4:
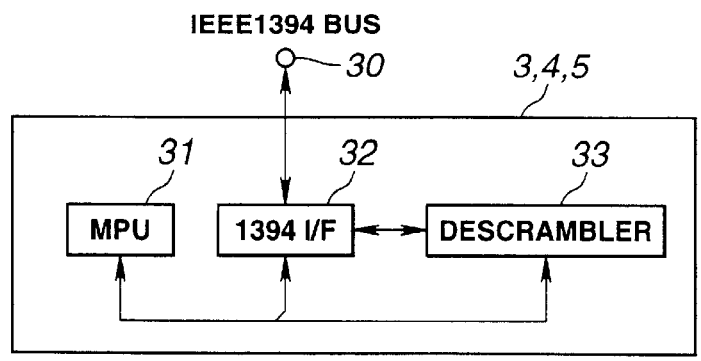
FIG. 4 is a block diagram showing a specified illustrative structure of a signal processing device.

Each of the signal processing devices 3 to 5 is configured as shown in FIG. 4.

In the signal processing device, shown in FIG. 4, data outputted by the reception device 2 and transmitted over the IEEE1394 bus 1 is routed to a terminal 30. The packet data, received over the IEEE1394 bus 1, are sent to an IEEE1394 interfacing unit 32.

The IEEE1394 interfacing unit 32 unpacketizes the packet data to route the resulting data to a descrambler 33. The data routed at this time to the descrambler 33 is the above-mentioned scrambled data.

The descrambler 33 descrambles the scrambled data, so that the data routed to the descrambler 33 is the above-mentioned scrambled data. The descrambled multiplexed data is sent to the IEEE1394 interfacing unit 32.

The IEEE1394 interfacing unit 32 packetizes the multiplexed data to route the resulting packet data via terminal 30 to the IEEE1394 bus 1.

The packet data, comprised of the multiplexed data outputted by the signal processing device and transmitted over the IEEE1394 interfacing unit 32, is inputted to the IEEE1394 interfacing unit 24 of the reception device 2 via the IEEE1394 bus 1 and a terminal 11 of the reception device 2 of FIG. 3.

The IEEE1394 interfacing unit 24, which has received the packet data from the signal processing device, unpacketizes the packet to route the resulting data to the demultiplexer 25. The data routed to the demultiplexer 25 is the above-mentioned multiplexed data.

The demultiplexer 25 separates (demultiplexes) the encoded video, audio and other data from the multiplexed data to route the demultiplexed data to an AV decoder 26. Meanwhile, the multiplexed data sent to the demultiplexer 25 may also be multiplexed data directly outputted by the demodulator 22, such as the broadcast signals of the non-chargeable broadcast programs, instead of being the descrambled multiplexed data, as described above.

The AV decoder 26 decodes the encoded video, audio and other data, demultiplexed by the demultiplexer 25, to restore the video, audio and other data. That is, the AV decoder 26 expands and decodes the video, audio and other data, encoded by the MPEG system, to restore the video, audio and other data. The restored video, audio and other data are routed to the IEEE1394 interfacing unit 24.

The IEEE1394 interfacing unit 24 packetizes the video, audio and other data, supplied from the AV decoder 26, to route the packet data via IEEE1394 bus 1 to the television receiver 6.

The television receiver 6 also includes a IEEE1394 interfacing (I/F) unit, not shown, for unpacketizing the packet data sent thereto via the IEEE1394 bus 1 to output the speech and to display the picture or letters based on the resulting video, audio and other data. If the video, audio and other data are sent directly from the AV decoder 26 to the television receiver 6, it is unnecessary for the television receiver 6 to have the IEEE1394 interfacing unit. If the television receiver 6 is the analog television receiver, analog video and audio signals are outputted by the AV decoder 26 and directly supplied therefrom to the analog television receiver.

The reception device 2 has a micro-processing unit (MPU) 23 which controls the operation of the tuner 21, demodulator 22, IEEE1394 interfacing unit 24, demultiplexer 25, and the AV decoder 26, and occasionally executes a variety of computations. An MPU 31 of the signal processing device controls the operation of the IEEE1394 interfacing unit 32 or the descrambler 33 as components of the signal processing device, while occasionally executing a variety of computations. The MPU 23 of the reception device 2 and the MPU 31 of the signal processing device has communication over the IEEE1394 bus 1 via the IEEE1394 interfacing unit 24 and the IEEE1394 interfacing unit 32.

In addition, the MPUs 23, 31 include an address space of the CSR architecture (control and status register) conforming to the CSR architecture having a 64-bit address space prescribed in ISO/IEC 13213.

Figure 5:
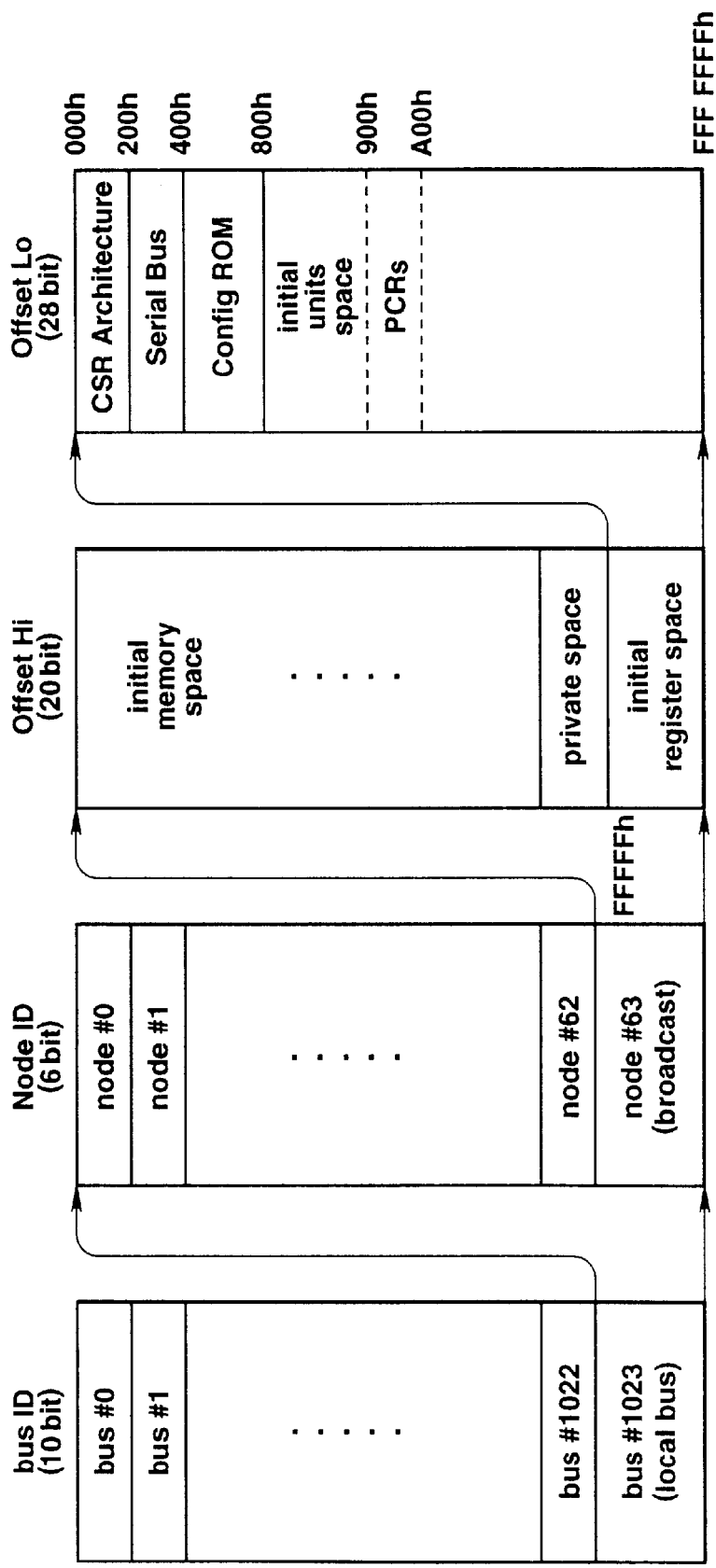
FIG. 5 illustrates the structure of an address space of a CSR architecture.

FIG. 5 illustrates the structure of the address space of the CSR architecture, in which upper 16 bits are node ID indicating a node on each IEEE1394, with the remaining 48 bits being used for designating the address space accorded to each node. The upper 16 bits are subdivided into 10 bits of the bus ID and 6 bits of the physical ID (node ID in the narrow sense of the term). Since all "1" is reserved for a special purpose, 1023 buses and 63 nodes can be specified by these bits.

Of the address space of 256 terabytes, specified by the lower 48 bits, the space defined by the upper 20 bits is split into an initial register space, used for a 2048 byte register peculiar to CSR and for register peculiar to the IEEE1394, a private space and to an initial memory space. On the other hand, if the space defined by the lower 20 bits of the space defined by the lower 28 bits is the initial register space, the space defined by the lower 28 bits is used as the configuration ROM (configuration read-only memory), an initial unit space used for node-specific purpose or as a plug control register (PCR).

FIG. 6 shows the main CSR offset address, name and operation. In FIG. 6, the offset means an offset address as from the address FFFFF0000000h from which begins the initial register space. The suffix h denotes that the hexadecimal notation system is used. The bandwidth available register, having an offset 220h, indicates the band that can be allocated to the isochronous communication and only the node value operating as the isochronous resource manager is validated. That is, while the CSR of FIG. 5 is owned by each node, only the bandwidth available register owned by the isochronous resource manager is validated. In other words, the bandwidth available register is effectively owned by solely the isochronous resource manager. For the bandwidth available register, a maximum value is kept if no band is allocated to the isochronous communication, with the value being decremented each time the band is allocated.

The channels available register, having the offset from 224h to 228h, has its respective bits associated with the channel numbers of from 0 to 63, with the bit 0 indicating that the channel has already been allocated. Only the channels available register of the node operating as the isochronous resource manager is valid.

Figure 7:
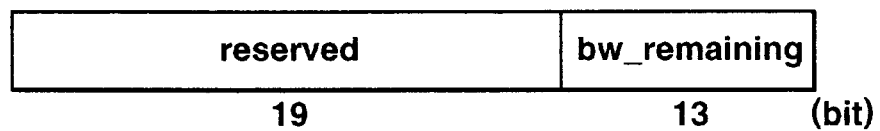
FIG. 7 illustrates a bit structure of a available register.

FIG. 7 shows the bit structure of the bandwidth available register. In the lower 13 bits of the bandwidth available register (bw_remaining of FIG. 7), a maximum value 4915, associated with 100 μs, is kept if no band is allocated to the isochronous communication of the path 6, with the value being decremented each time the band is allocated.

Figure 8:
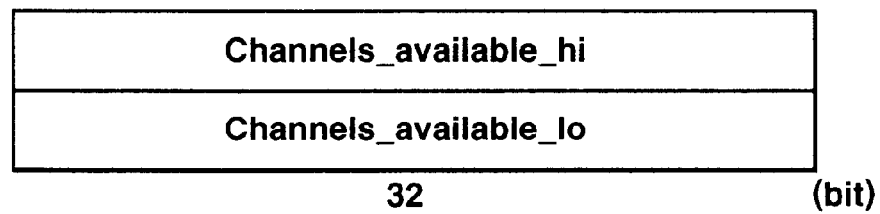
FIG. 8 illustrates a bit structure of a channel-wise available register.

FIG. 8 shows the bit structure of the channels available register. The register having an offset 224h stores bits corresponding to the channel numbers 32 to 63, while the register having the offset 228 stores the bits corresponding to the channel number of 0 to 31.

It is noted that the IEEE1394 standard defines the isochronous data transfer and the asynchronous data transfer as the synchronous communication and as the asynchronous communication, respectively. In the transmission/reception of the digital broadcast, as in the preferred embodiment, basically the isochronous data transfer is used, although asynchronous data transfer is also possible. In general, in isochronous data transfer, the node (equipment) needs to be a node having the function of the isochronous data transfer. In addition, if the node has the outputting function, the node has to own one or more output plug control register (pPCR), whereas, if the node has the input function, it has to own one or more input plug control register (iPCR). It is noted that only one channel can be allocated to a sole plug control register. The reception device and the respective signal processing devices are also configured in a corresponding manner, such that communication of the control contents between the reception device and the respective signal processing devices is basically effected by the asynchronous data transfer.

For controlling the input/output for the equipment over the interface, each node has the plug control register (PCR)

prescribed in IEC1883 in addresses 900h to 9FFh in the initial unit space in FIG. 5. This PCR materializes the concept "plug" for logically constituting the signal path analogous to the analog interface. FIG. 9 shows the structure of the PCR having an output plug control register (oPCR) representing an output plug and an input plug control register (iPCR) representing an input plug. The PCR also has a register oMPR (output master plug register) and iMPR (input master plug register) indicating the output plug and the input plug, respectively. Although each equipment does not own plural pMPRs nor iMPRs, it can have plural oPCRs and iPCRs, associated with the individual plugs, depending on the capacity of the equipment. The PCR shown in FIG. 9 has 31 oPCRs and 31 iPCRs. The flow of the isochronous data is controlled by actuating the registers associated with these plugs.

FIGS. 10A to 10D show the flow of the oMPR, oPCR, iMPR and iPCR. More specifically, FIGS. 10A to 10D show the the structures of oMPR, oPCR, iMPR and iPCR, respectively. In the 2-bit MSB side data rate capability of oMPR and iMPR, there is stored a code specifying the maximum transmission speed of the isochronous data that can be transmitted or received by the equipment. The broadcast channel base of oMPR provides the number of a channel used for broadcast outputting.

In the LSB side 5-bit number of output plugs of oMPR, there is stored the number of output plugs owned by the equipment, that is a value indicating the number of the oPCRs. In the LSB side 5-bit number of output plugs of iMPR, there is stored the number of input plugs owned by the equipment, that is a value indicating the number of the iPCRs. The non-persistent extension field and the persistent extension field are areas defined for future extension.

The on-line of the MSB of each of oPCR and iPCR denotes the plug using state. That is, if the value is 1 or 0, it indicates that the plug is on-line or off-line, respectively. The value of the broadcast connection counter of oPCR and iPCR denotes the presence (1) or absence (0) of the broadcast connection. The value of a 6-bit point-to-point counter of each of oPCR and iPCR indicates the number of the point-to-point connections owned by the plug.

The value of the 6-bit channel number of each of oPCR and iPCR denotes the number of the isochronous channels connected to the plug. The value of the 2-bit data rate of the oPCR denotes the actual transfer rate of the packet of the isochronous data outputted by the plug. The code stored in a 4-bit overhead ID of oPCR denotes the bandwidth of the isochronous communication overhead. The value of the 10-bit payload of oPCR denotes the maximum value of data contained in the isochronous packet and that can be handled by the plug.

Figure 11:
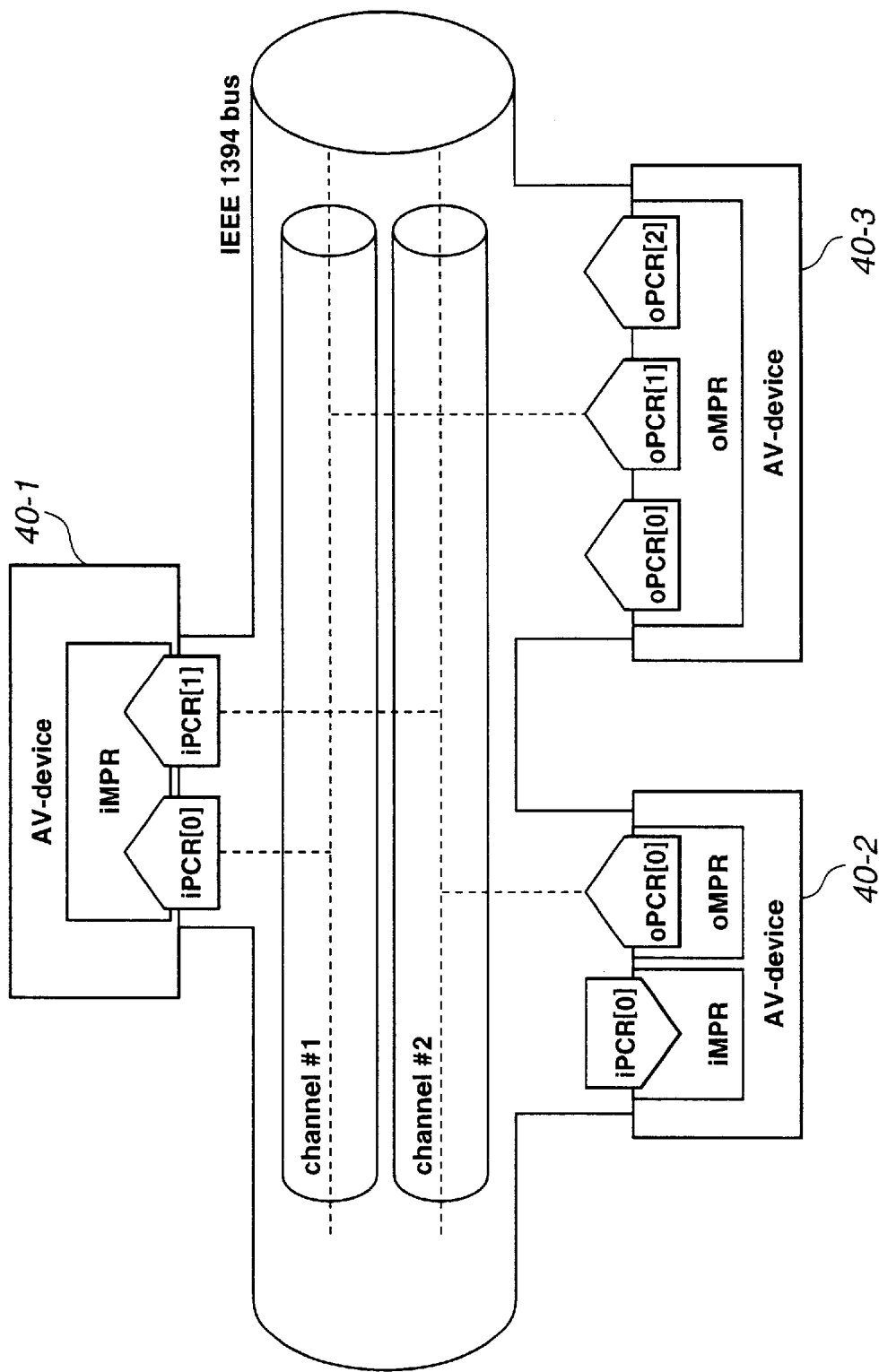
FIG. 11 illustrates the relation among a plug, as plug control register and an isochronous channel.

FIG. 11 shows the relation between the plug, plug control register and the isochronous channel. It is seen that AV devices 40-1 to 40-3 are interconnected over the IEEE1394 serial bus 1. The isochronous data having the channel specified by oPCR[1], among the oPCR[0] to oPCR[[2], having the transmission rate and the number of oPCRs defined by the oMPR of the AV device 40-3, is sent out to a channel #1 of the IEEE1394 serial bus. Of the iPCR[0] and oPCR[[1], having the transmission rate and the number of iPCRs defined by the iMPR of the AV device 40-1, the iMPR[0] having the specified input channel #1 reads the isochronous data sent out on the channel #1 of the IEEE1394 serial bus. Similarly, the AV device 40-2 sends isochronous data to the channel #2 designated by oPCR[0] to read the isochronous data from the channel #2 designated by the iPCR[1].

If, in the IEEE1394 standard, a given node sets a path with respect to another node, the firstly-stated node has to recognize the node ID of the counterpart node. In the system of the preferred embodiment, a reception device as the control node sets a path with respect to each of the signal processing devices. Therefore, the first phase is a phase in which a reception device recognizes the signal processing device.

It is assumed that the above-mentioned configuration ROM of the reception device describes the information that the counterpart node is the signal processing device and, if necessary, the information used in isochronous communication. The former information, referred to below as the recognition information, may, for example, be the information that the counterpart node is the broadcast provider of the digital broadcasting, while the latter information, referred to below as the route information, may, for example, be the bandwidth information. If necessary, other information may also be stated in the configuration ROM.

Figure 12:
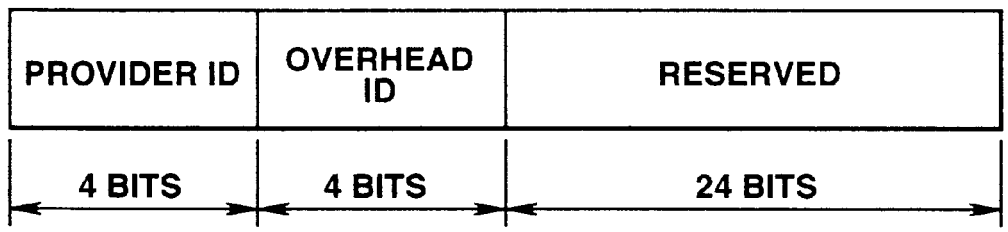
FIG. 12 shows an illustrative format of a configuration ROM provided in a signal processing device.

FIG. 12 shows an illustrative format of the configuration ROM provided in the MPU 31 of the signal processing device as a controlled node.

Referring to FIG. 12, a provider ID indicates on which broadcast provider the signal being processed by a signal processing device in question depends, and an overhead ID is a value used when writing the bandwidth value in a plug control register.

At the time of bus resetting, produced on power up of a node on the IEEE1394 bus or on renewed node connection, the reception device, as a control node, transmits a packet of an asynchronous read request to the totality of nodes on the IEEE1394 bus to read the contents of the configuration ROM of each node. The asynchronous packet may also be transmitted sequentially to the respective nodes.

If the reception device views the information of the response packet to the read request to recognize that the transmitter of the response packet is the information processing device, the reception device stores the node ID of the information processing device, the recognition information in the configuration ROM and the route information in a table. If the transmitter of the response packet is the node (equipment) other than the signal processing device, there is no necessity of storing the information.

If the user changes the program, the reception device receiving the change information attempts to set a path between it and the signal processing device using the information secured at the time of the bus resetting. However, if the program can be viewed without delivering the data to the signal processing device, as in the case of the non-chargeable broadcast, or if a signal processing device which depends on the broadcast provider of the program is not present on the bus 1, but the program of the broadcast provider is selected, the program may be outputted directly. If a path is already set between the reception device and the signal processing device associated with the signal processing device dependent on the other broadcast provider, but plural tuners are provided in the reception device and there are a vacant tuner and a vacant path, such path may be used.

In the preferred embodiment, the information is stated in the configuration ROM in order for the reception device to recognize the signal processing devices. However, if these signal processing devices can be recognized, any other suitable method may be used.

Also, in the preferred embodiment, the information is recognized at the time of bus resetting, and the information is stored in the table. However, if the user changes the program such that the path setting or path cancellation becomes necessary, the information may be recognized each time the program is changed. As means for reading the provider ID, an AV/C command may be used.

For discriminating the provider of the selected program, it is sufficient if an ID of the program provider is contained in the data of the reception signal of the selected program and detected for discrimination. The data containing the Provider ID is provided in a standard termed DMSI.

In the reception device receiving a program, the provider can be discriminated by providing a table for the provider IDs and the providers of the IDs. However, if the Ids specifying the providers and the provider IDs in the configuration ROM are equated to each other, this table can be omitted.

Since isochronous communication is used for transmission/reception of broadcast data between the reception device and the signal processing devices, it is necessary to provide an isochronous resource. For providing the isochronous resource, it is sufficient if the bandwidth available register and the channels available register of the isochronous resource manager are rewritten using a lock transaction.

If there are a bandwidth or a channel as the route information of the signal processing device, it may be used in order to rewrite the above-mentioned two registers. Failing the route information, it may be set depending on the status of the path. It is possible to use a value pre-set by the reception device 2.

If the isochronous resource is acquired, a plug control register, adapted to supervise the input and the output, as mentioned previously, is rewritten. The output plug control register (oPCR) of an output equipment and the input plug control register (iPCR) of an input equipment are set with the channels acquired as the resource. Among the connection methods for the plug control register, there are a so-called point-to-point connection and a broadcast connection. Since the point-to-point connection is usually employed for connecting pre-set equipments, this point-to-point connection is used for path interconnection between the reception device and the signal processing device. However, the broadcast connection may also be used.

In the preferred embodiment, two paths are set simultaneously between the reception device and the signal processing device (full duplex communication). Therefore, reception device and the signal processing device each use at least one output plug control register and at least one input plug control register.

Figure 13:
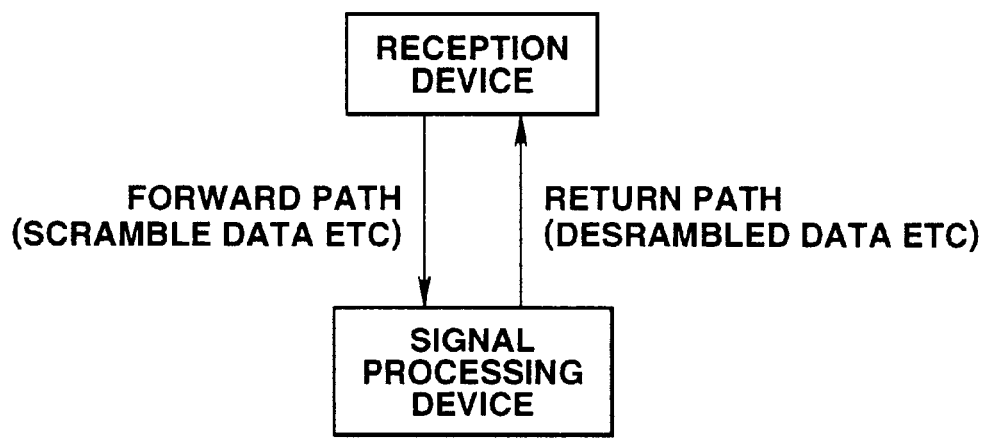
FIG. 13 shows the state in which two paths are set between the reception device and the signal processing device.

FIG. 13 shows an example of setting a path between the reception device and the signal processing device.

In the forward route, the output plug control register of the reception device and the input plug control register of the signal processing device are allocated in the same channel, and a path is set by the point-to-point connection. Similarly, in the return route, the input plug control register of the reception device and the output plug control register of the signal processing device are allocated in the same channel, and a path is set by the point-to-point connection.

As a matter of course, the path channels in such case assume different values in the forward and return routes. It does not matter which of the forward route and the return route is to be set first. It is only when both paths are set that data transmission/reception can be effected between the reception device and the signal processing device.

If two or more signal processing devices dependent on the same broadcast provider are present on a path, it does not matter which of the signal processing devices is to be connected to the reception device. However, if there is a bus manager on the path and a speed map can be utilized, this may be referred to in order to select the signal processing device connectable to the reception device and which affords the maximum processing speed for improving the efficiency.

If a path needs to b e cancelled due to, for example, program change by the user, such path is cancelled. Since the isochronous resource or the plug control register needs to be opened by the node which has acquired them, this processing is performed by the reception device. This, however, does not hold if the plug control register is connected by broadcast connection.

In FIG. 13, the output plug control register of the reception device 131 and the input plug control register of the signal processing device 132 are opened first to open the isochronous resource of the forward route. Similarly, the input plug control register of the reception device 131 is opened to open the isochronous resource of the forward route. In actuality, it does not matter which of the forward route and the return route is to be released first.

In the preferred embodiment, path setting and path removal are carried out mainly by the reception device. Alternatively, this setting of the forward and return routes may be effected separately by the reception device and by the signal processing device. Still alternatively, this setting may be effected by an equipment other than the reception device or the signal processing device. In any case, if the recognition method as in the preferred embodiment is used, the configuration ROM of the node to be recognized needs to be stated the information shown in FIG. 12. If the isochronous resource or the plug control register is to be opened, the node which set these needs to state the information. This, however, does not hold if the plug control register is connected by broadcast connection.

Figure 14:
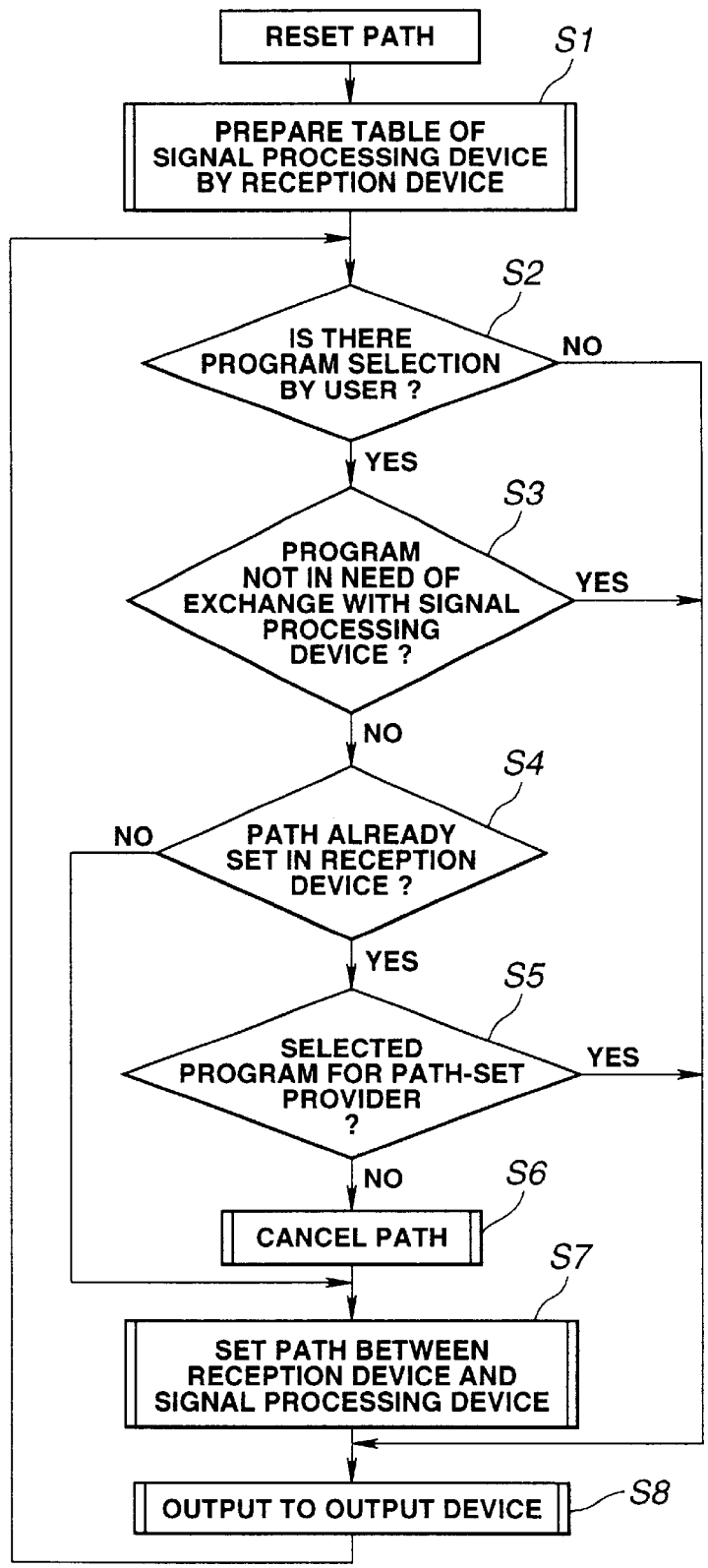
FIG. 14 is a flowchart showing the overall processing flow in the system embodying the present invention.

FIG. 14 shows the flowchart since the path setting between the reception device and the signal processing device until the path removal. It is assumed that, in the initial state, an optional program is being outputted as a default and that the reception device has only one tuner.

Referring to FIG. 14, a table of the signal processing device by the reception device is prepared. At the next step S2, it is verified whether or not program selection by the user has been made. If, at this step S2, it is verified that the program selection by the user has not been made, the program moves to step S8 to continue program outputting as before. On the other hand, if the program selection by the user has been made, the program moves to step S3.

At step S3, it is verified whether or not the program is such a one in which data transmission/reception with the signal processing device is unnecessary. If it is verified at this step S3 that the program is not in need of data transmission/reception, the program moves to step S8 to continue the program outputting as before. If conversely data transmission/reception is found to be necessary, the program moves to step S4.

At step S4, it is verified whether or not a path has already been set in the reception device. If, at this step S4, it is verified that a path has not been set, the program moves to step S7 and, if otherwise, the program moves to step S5.

At step S5, it is verified whether or not the selected program is associated with a broadcast provider in which a path has already been set. If it is verified that the selected program is associated with a broadcast provider in which a path has already been set, the program moves to step S8 to continue program outputting as before. If it is verified that a path has not as yet been set, the program moves to step S6.

At step S6, the path is cancelled. The program moves to step the next step S7.

At step S7, a path is set between the reception device and the signal processing device. At the next step S8, the program is outputted on the so-set path.

Figure 15:
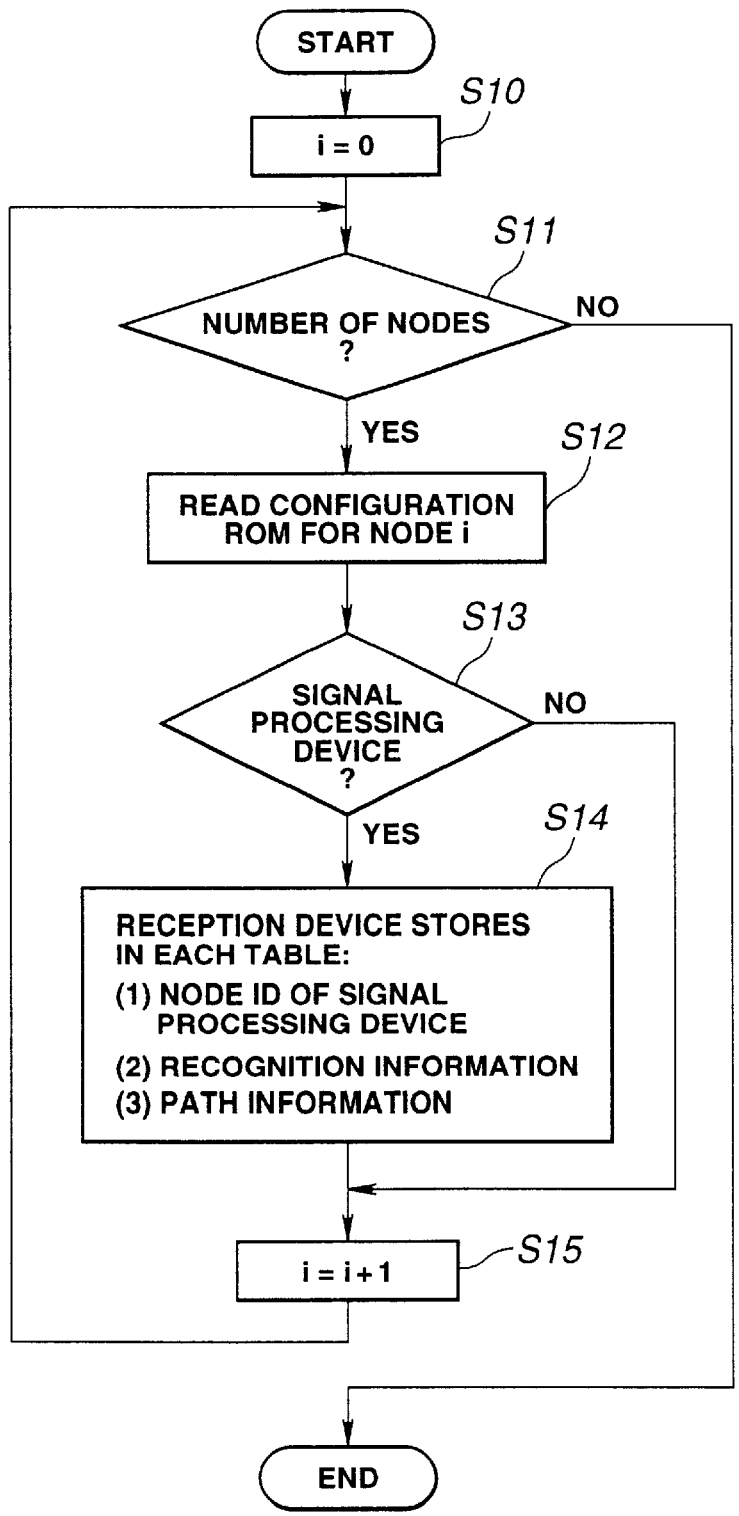
FIG. 15 is a flowchart showing the processing flow when the reception device prepares a table of the signal processing device.

FIG. 15 shows the flowchart for the reception device to prepare a table of the signal processing device.

At step S15 in FIG. 15, a variable i is set to an initial value 0. At the next step S11, it is verified whether or not the variable i is smaller than the total number of nodes. If it is verified at this step S10 that the variable i is not smaller than the total number of nodes, that is if the variable i is equal to or larger than the total number of nodes, the processing is terminated. If conversely the variable i is verified to be smaller than the total number of nodes, the program moves to step S12.

At step S12, the configuration ROM is read for the node associated with the variable i. At the next step S13, it is verified whether or not the node is the signal processing device. If, at this step S13, the node is verified not to be the signal processing device, the program moves to step S15 to increment the variable i. The program then reverts to step S11. If the node is verified to be the signal processing device, the program moves to step S14.

At this step S14, the reception device causes the node ID of the signal processing device, recognition information and the route information to be stored in the table. After this step S14, the program moves to step S15 to increment the variable by 1. The program then reverts to step S11.

Figure 16:
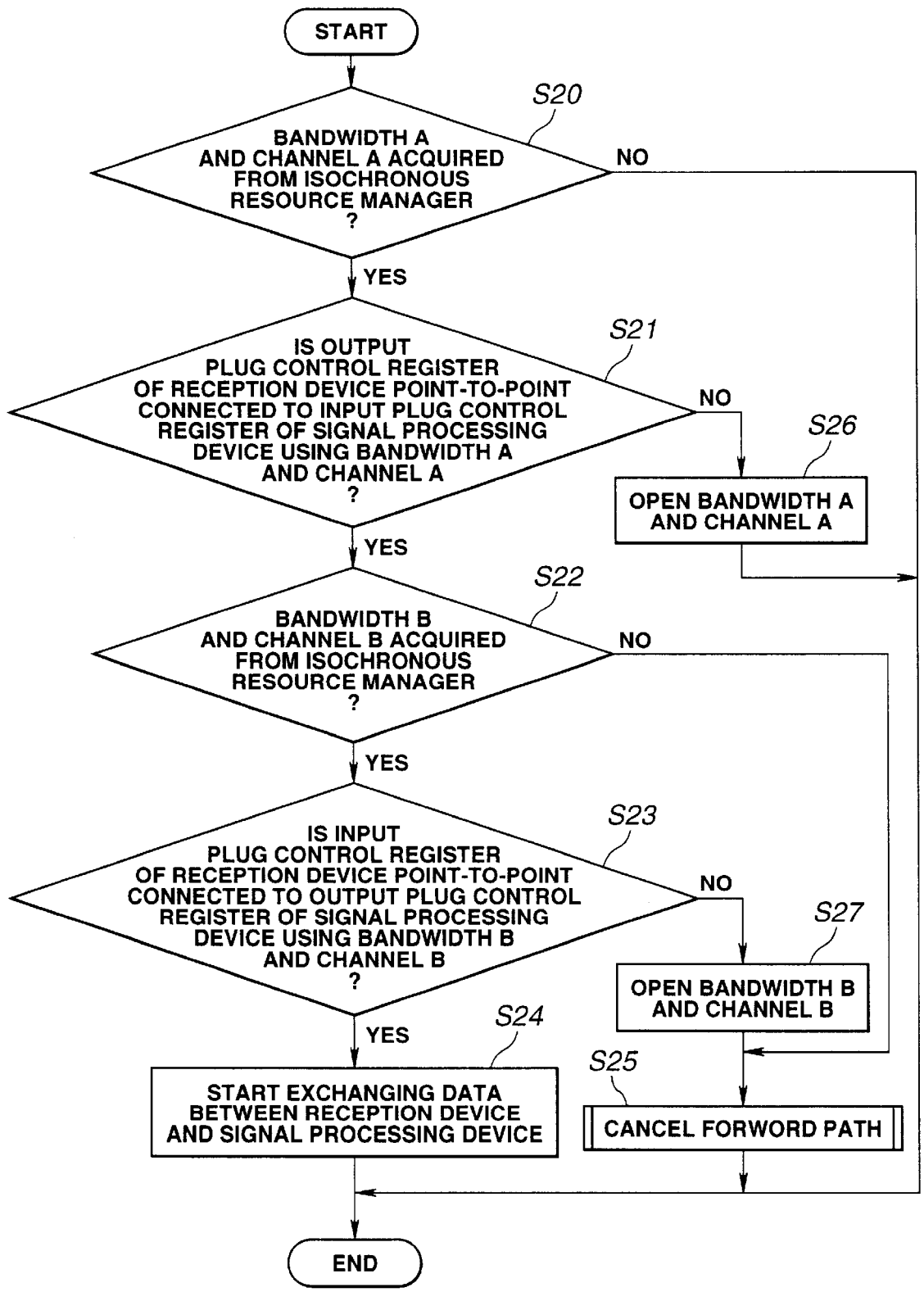
FIG. 16 is a flowchart showing the processing flow when a path between the reception device and the signal processing device is set.

FIG. 16 shows the flowchart when a path is set between the reception device and the signal processing device. In this figure, A and B denote that the bandwidth and the channel are those for the forward channel and those for the return channel, respectively.

At step S20 in FIG. 16, it is verified whether or not the bandwidth and the channel for the forward route A have been acquired from the isochronous resource manager. If, at this step S20, the bandwidth and the channel for the forward route A have not been acquired, the processing is terminated and, if otherwise, the program moves to step S21.

At step S21, it is verified whether or not the output plug control register of the reception device and the input plug control register of the reception device have been interconnected by point-to-point connection using the bandwidth and the channel of the forward route A. If, at this step S21, it has been found that such interconnection has not been made, the bandwidth and the channel of the forward route A are opened at step S26 and subsequently the processing is terminated. If it has been found that such interconnection has not been made, the program moves to step S22.

At step S22, it is verified whether or not the bandwidth and the channel of the return route B have been acquired from the isochronous resource manager. If it is verified at this step S22 that the bandwidth and the channel of the return route B have not been acquired, the path of the forward route is cancelled at step S25 to terminate the processing. If it is verified at step S22 that the bandwidth and the channel of the return route B have been acquired, the program moves to step S23.

At step S23, it is verified whether or not the input plug control register of the reception device and the output plug control register of the signal processing device have been interconnected by point-to-point connection using the bandwidth and the channel of the return channel B. If it is verified at step S23 that such connection has not been made, the bandwidth and the channel of the return path B are opened at step S27, after which the path of the forward route is cancelled at step S25 to terminate the processing. If it is verified at step S23 that such connection has not been made, the program moves to step S24.

At step S24, data transmission/reception is started between the reception device and the signal processing device to terminate the processing of FIG. 16.

Figure 17:
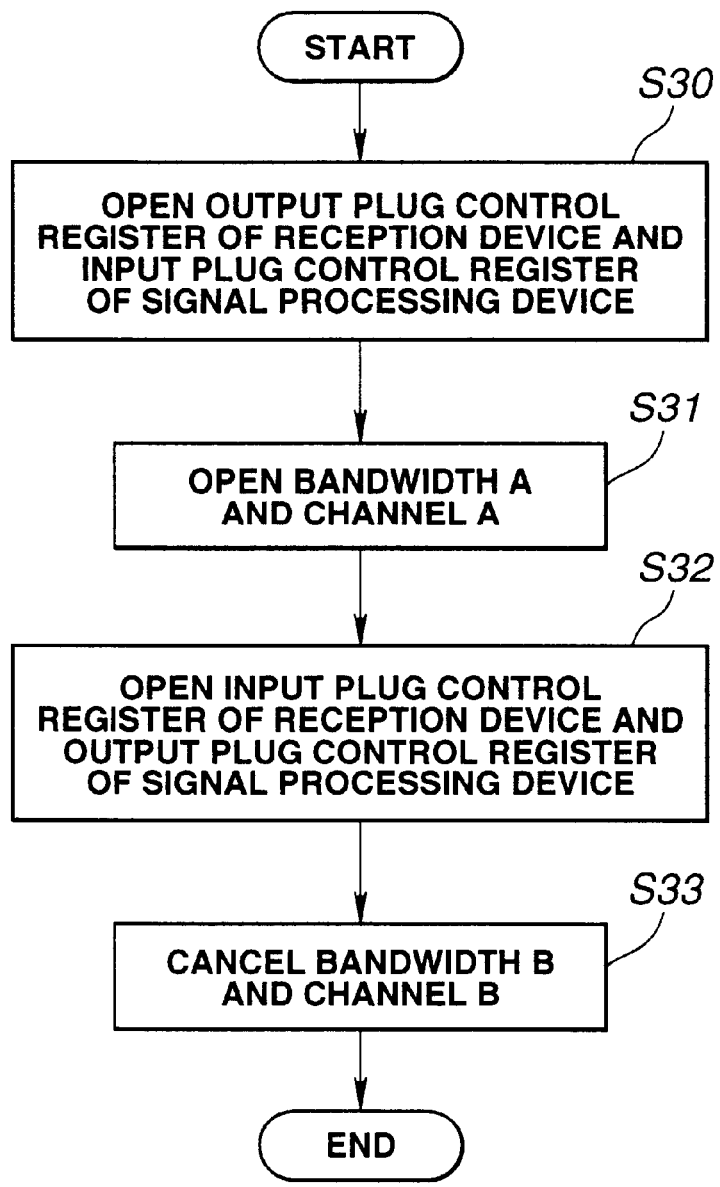
FIG. 17 is a flowchart showing the processing flow when a path between the reception device and the signal processing device is cancelled.

FIG. 17 shows the flowchart for cancelling the path between the reception device and the signal processing device.

At step S30 in FIG. 17, the output plug control register of the reception device and the input plug control register of the signal processing device are opened. The program then moves to step S31.

At step S31, the bandwidth and the channel of the forward route A are opened, before the program moves to step S32.

At this step S32, the input plug control register of the reception device and the output plug control register of the signal processing device are opened. The program then moves to step S33.

At step S33, bandwidth and the channel of the return route B are opened, before the processing is terminated.

What is claimed is:

1. A communication controlling method in which a plurality of signals containing a hierarchy in need of different processing and a hierarchy that permits common processing are transmitted or received over a network, wherein a plurality of information processing apparatuses connect to said network, comprising:

a designating step for designating which of said plural signals is to be processed to output the result of designation;

a differential processing step for performing differential processing in a first information processing apparatus for respective signals of said hierarchy in need of different processing;

an identical processing step for performing common processing in a second information processing apparatus for said hierarchy in said plural signals that permits common processing; and a route setting or cancelling step for setting or cancelling a communication route on said network for transmitting/receiving signals to/from said first information processing apparatus connected to said network and to/from said second information processing apparatus connected to said network, based on a result of said designation.

2. The communication controlling method according to claim 1 wherein said communication route includes a first route from said identical processing step to said differential processing step and a second route from said differential processing step to said identical processing step.

3. The communication controlling method according to claim 1 wherein said communication route is a serial bus conforming to the IEEE1394 standard.

4. The communication controlling method according to claim 1 wherein said plural signals are scrambled broadcast signals, said communication controlling method further comprising:

a reception step for receiving said scrambled broadcast signals.

5. The communication controlling method according to claim 4 wherein said hierarchy in need of different processing is scrambling on said scrambled broadcast signals and wherein said differential processing step descrambles said scrambled broadcast signals.

6. The communication controlling method according to claim 5 wherein said differential processing step descrambles the scrambled broadcast signals using a key of a provider of said scrambled broadcast signals.

7. The communication controlling method according to claim 4 wherein said identical processing step includes
   a demodulating sub-step of demodulating said scrambled broadcast signals and outputting demodulated broadcast signals;
   a demultiplexing sub-step of demultiplexing multiplexed data corresponding to the demodulated broadcast signals to output demultiplexed data; and
   a decoding sub-step of decoding said demultiplexed data to output decoded data.

8. The communication controlling method according to claim 7 wherein said multiplexed data is obtained on descrambling said scrambled broadcast signals in said differential processing step.

9. A communication controlling system in which a plurality of signals containing a hierarchy in need of different processing and a hierarchy that permits common processing are transmitted or received over a network, wherein a plurality of information processing apparatuses connect to said network, comprising:
   a first information processing apparatus connected to said network comprising,
   identical processing means for performing common processing for said hierarchy in said plural signals that permit common processing,
   designating means for designating which of said plural signals is to be processed to output the result of designation, and route setting or cancelling means for setting or cancelling a communication route on said network for transmitting/receiving signals to/from an information processing apparatus connected to said network, based on a result of said designation; and
   one or more information processing apparatuses connected to said network, comprising,
   differential processing means for performing differential processing for respective signals of said hierarchy in need of different processing,
   route setting or cancelling means for setting or cancelling a communication route on said network for transmitting/receiving signals to/from said first information processing apparatus connected to said network, based on a result of said designation.

10. The communication controlling system according to claim 9 wherein said communication route includes a first route from said identical processing means to said differential processing means and a second route from said differential processing means to said identical processing means.

11. The communication controlling system according to claim 9 wherein said communication route is a serial bus conforming to the IEEE1394 standard.

12. The communication controlling system according to claim 9 wherein said plural signals are scrambled broadcast signals, said communication controlling system further comprising:
   a reception means for receiving said scrambled broadcast signals.

13. The communication controlling system according to claim 12 wherein said hierarchy in need of differential processing is scrambling on said scrambled broadcast signals and wherein said differential processing means descrambles said scrambled broadcast signals.

14. The communication controlling system according to claim 13 wherein said differential processing means descrambles the scrambled broadcast signals using a key of a provider of said scrambled broadcast signals.

15. The communication controlling system according to claim 12 wherein said identical processing means includes
   demodulating means for demodulating said scrambled broadcast signals and outputting demodulated broadcast signals;
   demultiplexing means for demultiplexing multiplexed data corresponding to the demodulated broadcast signals to output demultiplexed data; and
   decoding means for decoding said demultiplexed data.

16. The communication controlling system according to claim 15 wherein said multiplexed data is obtained on descrambling said scrambled broadcast signals in said differential processing means.

17. A communication controlling apparatus in which a plurality of signals containing a hierarchy in need of different processing and a hierarchy that permits common processing are transmitted or received over a network, wherein a plurality of information processing apparatuses connect to said network, comprising:
   designating means for designating which of said plural signals is to be processed to output the result of designation;
   selecting means for selecting differential processing means adapted for performing processing on said hierarchy contained in the designated signals in need of different processing, based on said result of designation, in a manner in meeting with the designated signals;
   identical processing means for performing common processing for said hierarchy in said plural signals that permits common processing; and
   route setting or cancelling means for setting or cancelling a communication route on said network for transmitting/receiving signals between said identical processing means in a first information processing apparatus and said differential processing means as set in a second information processing apparatus.

18. The communication controlling apparatus according to claim 17 wherein said communication route includes a first route for transmitting signals processed by said identical processing means from said identical processing means to said differential processing means and a second route for transmitting signals processed by said differential processing means from said differential processing means to said identical processing means.

19. The communication controlling apparatus according to claim 17 wherein said communication route is a serial bus conforming to the IEEE1394 standard.

20. The communication controlling apparatus according to claim 17 wherein said plural signals are scrambled broadcast signals, said communication controlling apparatus further comprising:
   reception means for receiving said scrambled broadcast signals.

21. The communication controlling apparatus according to claim 20 wherein said hierarchy in need of differential processing is scrambling on said scrambled broadcast signals and wherein said differential processing means descrambles said scrambled broadcast signals.

22. The communication controlling apparatus according to claim 21 wherein said differential processing means descrambles the scrambled broadcast signals using a key of a provider of said scrambled broadcast signals.

23. The communication controlling apparatus according to claim 20 wherein said identical processing means includes demodulating means for demodulating said scrambled broadcast signals and outputting demodulated broadcast signals;

demultiplexing means for demultiplexing multiplexed data corresponding to the demodulated broadcast signals to output demultiplexed data; and decoding means for decoding said demultiplexed data to output decoded data.

24. The communication controlling apparatus according to claim 23 wherein said multiplexed data is obtained on descrambling said scrambled broadcast signals in said differential processing means.

25. A communication controlling apparatus in which a plurality of signals containing a hierarchy in need of different processing and a hierarchy that permits common processing are transmitted or received over a network, wherein a plurality of information processing apparatuses connect to said network, comprising:

route means for setting or cancelling a communication route on said network adapted for inputting at least one of said plural signals;

differential processing means for processing said hierarchy in need of different processing contained in the input signals in a manner in meeting with said input signals; and sending means for sending the signals processed by said differential processing means in a first information processing apparatus via said communication route to identical processing means in a second information processing apparatus adapted for processing the hierarchy that permits common processing.

26. The communication controlling apparatus according to claim 25 wherein said communication route is a serial bus conforming to the IEEE1394 standard.

27. The communication controlling apparatus according to claim 25 wherein said plural signals are scrambled broadcast signals, said communication controlling apparatus further comprising:

reception means for receiving said scrambled broadcast signals.

28. The communication controlling apparatus according to claim 27 wherein said hierarchy in need of different processing is scrambling on said scrambled broadcast signals and wherein said differential processing means descrambles said scrambled broadcast signals.

29. The communication controlling apparatus according to claim 28 wherein said differential processing means descrambles the scrambled broadcast signals using a key of a provider of said scrambled broadcast signals.

\* \* \* \* \*